United States Patent
Horie et al.

[11] Patent Number: 6,124,062
[45] Date of Patent: Sep. 26, 2000

[54] NON-AQUEOUS ELECTROLYTIC SOLUTION, AND NON-AQUEOUS ELECTROLYTE CELL COMPRISING IT

[75] Inventors: Takeshi Horie; Kazuhiro Noda; Shinichiro Yamada, all of Kanagawa, Japan

[73] Assignee: Sony Corporation, Tokyo, Japan

[21] Appl. No.: 09/233,910

[22] Filed: Jan. 21, 1999

[30] Foreign Application Priority Data

Jan. 26, 1998 [JP] Japan .................................. 10-013001
Aug. 5, 1998 [JP] Japan .................................. 10-222150

[51] Int. Cl.$^7$ .............................. H01M 6/14; H01M 4/60
[52] U.S. Cl. .......................................... 429/324; 429/212
[58] Field of Search .................... 429/194, 188, 429/190, 191, 192, 212, 324

[56] References Cited

U.S. PATENT DOCUMENTS

| | | | |
|---|---|---|---|
| 4,668,595 | 5/1987 | Yoshino et al. | 429/194 |
| 5,455,127 | 10/1995 | Olsen et al. | 429/192 |
| 5,529,860 | 6/1996 | Skotheim et al. | 429/213 |
| 5,538,812 | 7/1996 | Lee et al. | 429/192 |
| 5,691,084 | 11/1997 | Kita et al. | 429/194 |

FOREIGN PATENT DOCUMENTS

| | | |
|---|---|---|
| 0 704 922 A1 | of 1996 | European Pat. Off. . |
| 59-224072 | of 1984 | Japan . |
| 60-216461 | of 1985 | Japan . |
| 60-216462 | of 1985 | Japan . |

*Primary Examiner*—Yogendra Gupta
*Assistant Examiner*—John M. Petruncio
*Attorney, Agent, or Firm*—Hill & Simpson

[57] ABSTRACT

Disclosed is a non-aqueous electrolytic solution comprising a specific siloxane derivative of the following chemical formula 1 or 2, and at least one light metal salt such as an alkali metal salt:

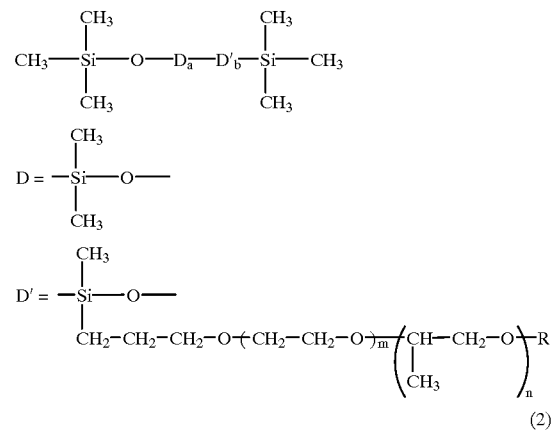

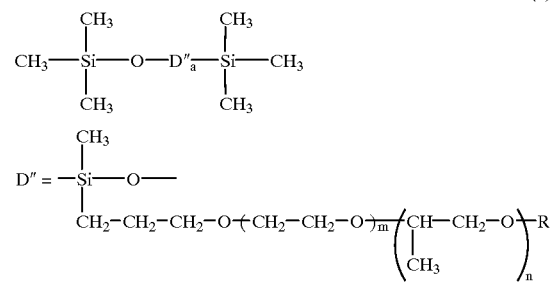

Also disclosed is a non-aqueous electrolyte cell comprising the electrolytic solution. The electrolytic solution has good chemical and thermochemical stability, and the cell comprising it has high safety, and has good cell capabilities even at high voltage.

19 Claims, 2 Drawing Sheets

NON-AQUEOUS ELECTROLYTIC SOLUTION, AND NON-AQUEOUS ELECTROLYTE CELL COMPRISING IT

FIELD OF THE INVENTION

The present invention relates to a specific non-aqueous electrolytic solution, and to a non-aqueous electrolyte cell comprising it, of which the safety in short-circuit is improved and which exhibits excellent cell capabilities even at high voltage.

RELATED APPLICATION DATA

The present application claims priority to Japanese Applications No. P10 013001 filed Jan. 26, 1998 and P10-222150 filed Aug. 5, 1998 which applications are incorporated herein by reference to the extent permitted by law.

BACKGROUND OF THE INVENTION

Recently, portable electric appliances such as camera-combined video tape recorders, portable telephones, lap-top computers and others have been being much popularized. From the viewpoint of environmental protection, the development of electric cars not discharging exhaust gas of NOx and the like has been being a subject matter for social discussion. Given that situation, studies for developing portable electric powers, and also clean energy sources of batteries, especially secondary batteries are being made actively. Above all, lithium or lithium ion secondary batteries are considered greatly hopeful, as producing higher energy density as compared with conventional aqueous electrolyte secondary batteries comprising lead cells or nickel-cadmium cells.

As the electrolytic solution for the lithium or lithium ion cell, widely used is a liquid comprising, as the electrolyte, a lithium-based electrolyte salt such as $LiPF_6$ or the like, as dissolved in a non-aqueous, carbonate-based solvent such as low-molecular ethylene carbonate, propylene carbonate, diethyl carbonate or the like, since its electric conductivity is relatively high and since it is stable for cell potential.

Though having high capabilities, the non-aqueous electrolyte cell noted above is problematic in its safety, since a combustible organic solvent is used in the electrolytic solution therein. For example, one problem is that, when the cell is short-circuited, a large current rapidly passes through it to generate heat, thereby resulting in that the electrolytic solution containing an organic solvent in the cell is vaporized and decomposed to produce gas. Owing to the gas generation, the cell will be broken, exploded or ignited. One conventional method for solving this problem comprises equipping a safety valve or a current-blocking device capable of opening or acting depending on the increase in the inner pressure of the cell.

However, the improvement in the constitutional mechanism could not always apply to any and every problem with the cell. Therefore, it is necessary to drastically improve the cell material for the purpose of improving the safety capabilities of the cell.

The present invention has been proposed for the purpose of solving the problem noted above, and one object of the invention is to provide a non-aqueous electrolytic solution having excellent chemical and thermochemical stability. Another object of the invention is to provide a non-aqueous electrolyte cell having excellent cell capabilities, in which the electrolytic solution is prevented from being vaporized and decomposed thereby reducing the danger of cell breakage and ignition that may be caused by gas generation in the cell.

In order to attain the objects noted above, we, the present inventors have assiduously studied, and, as a result, have found that, when an inorganic polymer siloxane derivative which has high chemical stability and is hardly combustible or has a low vapor pressure is used as an electrolyte solvent in a cell, then the electrolytic solution comprising the solvent is prevented from being vaporized and decomposed in the cell, thereby reducing the danger of cell breakage and ignition, and that the cell comprising the electrolytic solution has excellent cell capabilities.

SUMMARY OF THE INVENTION

Accordingly, the invention provides a non-aqueous electrolytic solution characterized by comprising a siloxane derivative of the following chemical formula 5, and at least one alkali metal salt.

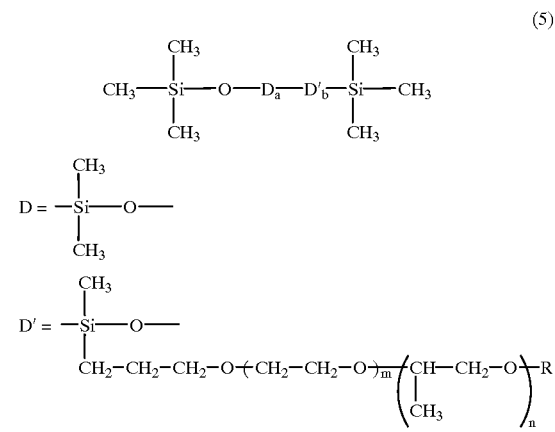

wherein a represents an integer of from 1 to 50; b represents an integer of from 1 to 20; m represents an integer of from 0 to 40; n represents an integer of from 0 to 40; R represents a hydrogen atom, or an optionally-substituted alkyl group; provided that when b>1, a plural number b of D's may be the same or different ones.

The siloxane derivative preferably has a coefficient of kinematic viscosity at 25° C. of not larger than 5000 cSt, and preferably has a mean molecular weight of not larger than 10000. When the coefficient of kinematic viscosity and the mean molecular weight of the siloxane derivative are so optimized as above, it is possible to produce a solvent of the derivative having a suitable viscosity for good use in the electrolytic solution, and having a suitable solubility for good mixability in preparing the electrolytic solution.

As comprising the inorganic polymer siloxane derivative which has high chemical stability and is hardly combustible or has a low vapor pressure, the non-aqueous electrolytic solution of the invention is prevented from being vaporized and decomposed in the cell comprising it, thereby reducing the danger of cell breakage and ignition, and the cell comprising the electrolytic solution has excellent cell capabilities even at high voltage.

The invention also provides a non-aqueous electrolyte cell, which comprises a positive electrode of an oxide or a sulfide capable of being doped/dedoped with a lithium ion, and a negative electrode of a carbon material capable of being doped/dedoped with a lithium metal, a lithium alloy or an lithium ion. The cell is characterized by comprising a non-aqueous electrolytic solution that comprises a siloxane derivative of the following chemical formula 6, and at least one lithium metal salt:

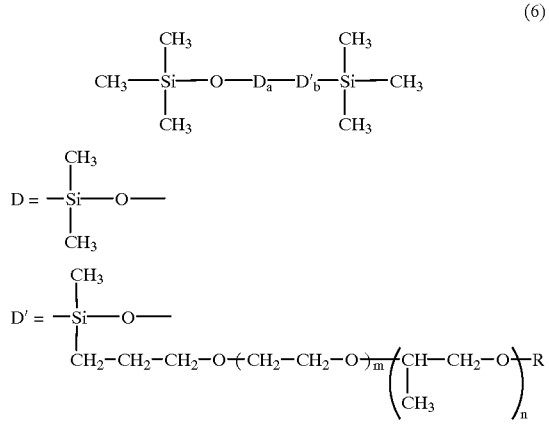

(6)

wherein a represents an integer of from 1 to 50; b represents an integer of from 1 to 20; m represents an integer of from 0 to 40; n represents an integer of from 0 to 40; R represents a hydrogen atom, or an optionally-substituted alkyl group; provided that when b>1, a plural number b of D's may be the same or different ones.

The siloxane derivative preferably has a coefficient of kinematic viscosity at 25° C. of not larger than 5000 cSt, and preferably has a mean molecular weight of not larger than 10000. When the coefficient of kinematic viscosity and the mean molecular weight of the siloxane derivative are so optimized as above, it is possible to produce a solvent of the derivative having a suitable viscosity for good use in the electrolytic solution, and having a suitable solubility for good mixability in preparing the electrolytic solution.

Since the electrolytic solution in the non-aqueous electrolyte cell of the invention comprises the inorganic polymer siloxane derivative which has high chemical stability and is hardly combustible or has a low vapor pressure, it is prevented from being vaporized and decomposed when the cell is short-circuited, thereby reducing the danger of cell breakage and ignition, and the cell has excellent cell capabilities even at high voltage.

The invention further provides a non-aqueous electrolytic solution, which comprises a siloxane derivative of the following chemical formula 7, and at least one light metal salt.

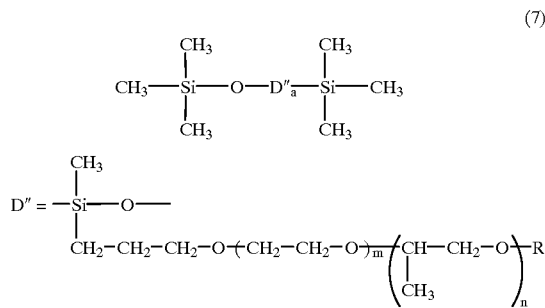

(7)

wherein a represents an integer of from 1 to 50; m represents an integer of from 0 to 40; n represents an integer of from 0 to 40; R represents a hydrogen atom or an alkyl group; provided that when a>1, a plural number a of D"s may be the same or different ones; and hydrogens in D" and R may be optionally substituted with halogen atoms.

The invention still further provides a cell, which comprises a positive electrode, a negative electrode, a separator disposed between the positive electrode and the negative electrode, and a non-aqueous electrolytic solution comprising a siloxane derivative of the following chemical formula 8 and at least one light metal salt:

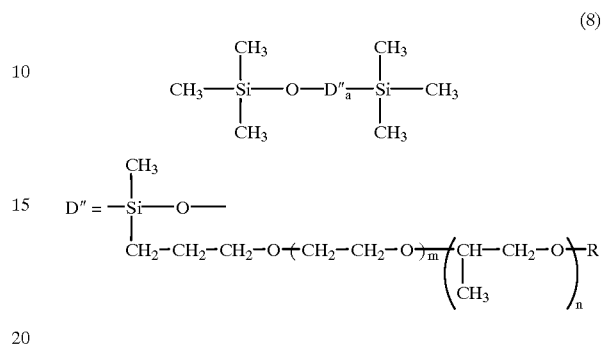

(8)

wherein a represents an integer of from 1 to 50; m represents an integer of from 0 to 40; n represents an integer of from 0 to 40; R represents a hydrogen atom or an alkyl group; provided that when a>1, a plural number a of D"s may be the same or different ones; and hydrogens in D" and R may be optionally substituted with halogen atoms.

DETAILED DESCRIPTION OF THE INVENTION

Figure 1:
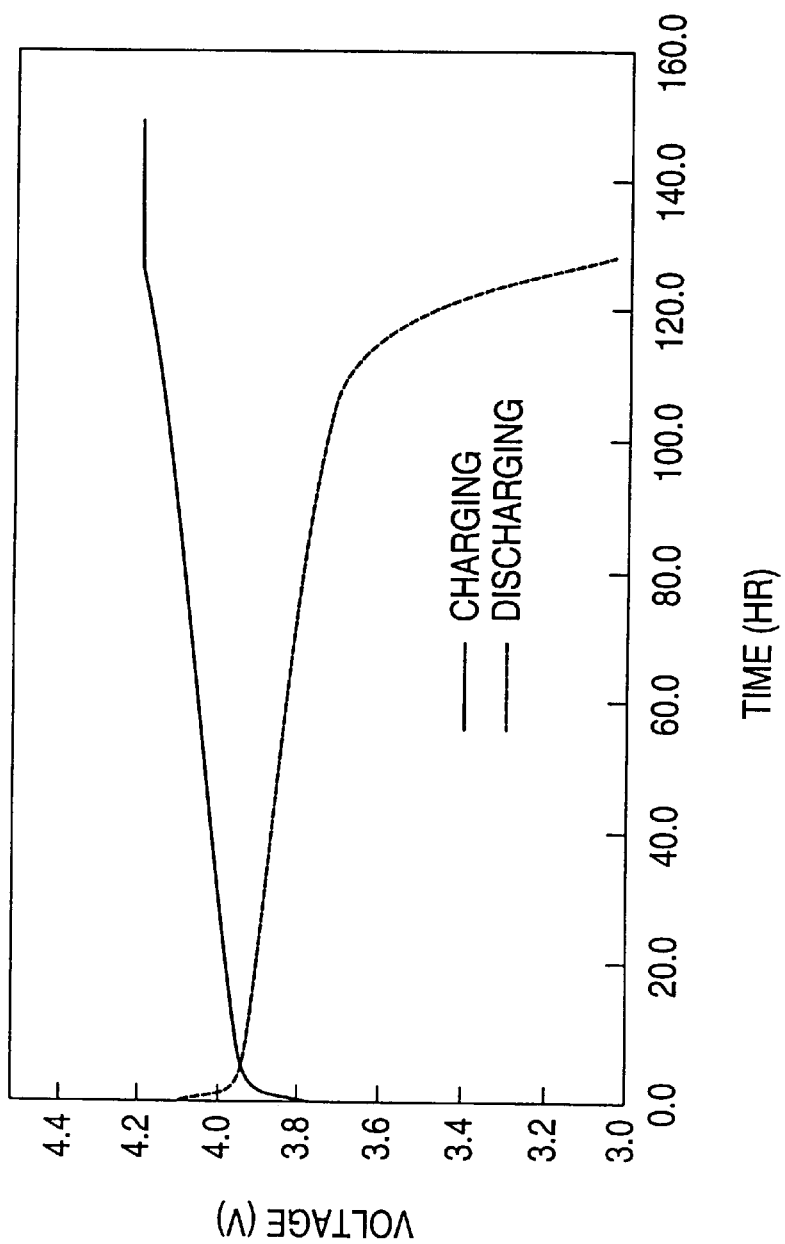
FIG. 1 is a characteristic graph showing the charge-discharge curves in the discharge characteristic test of the non-aqueous electrolyte cell of Example 3 of the invention.

The non-aqueous electrolytic solution and the non-aqueous electrolyte cell comprising it of the invention are described in detail hereinunder.

One embodiment of the non-aqueous electrolytic solution of the invention is characterized by comprising a siloxane derivative of the following chemical formula 9, and at least one alkali metal salt.

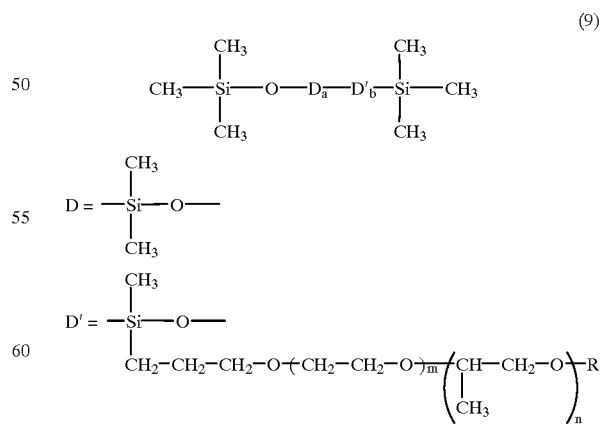

(9)

wherein a represents an integer of from 1 to 50; b represents an integer of from 1 to 20; m represents an integer of from 0 to 40; n represents an integer of from 0 to 40; R represents a hydrogen atom, or an optionally-substituted alkyl group; provided that when b>1, a plural number b of D's may be the same or different ones.

Another embodiment of the non-aqueous electrolytic solution of the invention comprises a solvent of a siloxane derivative of the following chemical formula 10, and an electrolyte of at least one light metal salt.

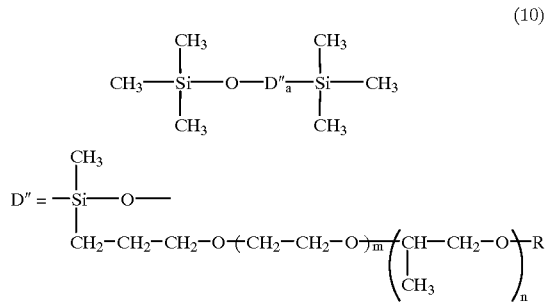

(10)

wherein a represents an integer of from 1 to 50; m represents an integer of from 0 to 40; n represents an integer of from 0 to 40; R represents a hydrogen atom or an alkyl group; provided that when a>1, a plural number a of D"s may be the same or different ones; and hydrogens in D" and R may be optionally substituted with halogen atoms.

The siloxane derivatives are linear siloxane derivatives of which the backbone skeleton comprises linear silicon-oxygen bonds and has mono-valent organic side chain(s) bonded to the silicon atom(s). These are inorganic polymers having high chemical stability and even high thermochemical stability, as being hardly combustible and having a low vapor pressure.

The siloxane derivatives are desired to be liquid having a relatively low viscosity, and are desired to have a structure capable of dissolving alkali metal salts. Specifically, the siloxane derivatives are desired to have a coefficient of kinematic viscosity at 25° C. of not larger than 5000 cSt (centistokes) and have a mean molecular weight of not larger than 10000.

More preferably, the electrolytic solution is desired to have an electric conductivity at 25° C. of not smaller than 0.1 mS·cm$^{-1}$.

The suitable viscosity of the siloxane derivatives for good use in the electrolytic solution and the suitable solubility thereof for good mixability in preparing the electrolytic solution may be realized by suitably selecting the chains of D, D' and D" and the side chains in D' and D" in the chemical formulae 9 and 10. It is advantageous that the side chains in D' and D" in the chemical formulae 9 and 10 contain ether bonding. More preferably, a is from 1 to 50, b is from 1 to 20, and the sum of a and b is from 1 to 40. Hydrogens in D, D', D" and the substituent R may be substituted with halogen elements such as fluorines, bromines, etc.

The metal salt to be dissolved in the siloxane derivatives includes light metal salts of lithium, sodium, aluminium and the like, and may be suitably determined depending on the type of the cell comprising the non-aqueous electrolytic solution.

For example, for constructing lithium or lithium ion secondary cells, usable are lithium salts such as $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_8F_{17}SO_3Li$, $(C_2F_5SO_2)_2NLi$, $(C_4F_9SO_2)(CF_3SO_2)NLi$, $(FSO_2C_6F_4)(CF_3SO_2)NLi$, $((CF_3)_2CHOSO_2)_2NLi$, $(CF_3SO_2)_3CLi$, $(C_6F_3(CF_3)_2-3,5)_4BLi$, $LiCF_3$, $LiAlCl_4$, etc.

In the non-aqueous electrolytic solution comprising the siloxane derivative and the alkali metal salt noted above, the solvent, siloxane derivative has good chemical stability and thermochemical stability. Therefore, even when a large current rapidly passes through the electrolytic solution in short-circuit, the solution is prevented from being vaporized and decomposed. As a result, the non-aqueous electrolyte cell comprising the non-aqueous electrolytic solution is protected from the danger of rapid cell breakage and ignition when it is short-circuited, and its safety is improved. Even at high voltage, the cell can exhibit excellent cell capabilities.

The non-aqueous electrolytic solution noted above is favorable for a non-aqueous electrolyte secondary cell comprising a positive electrode of an oxide or a sulfide capable of being doped/dedoped with lithium, and a negative electrode of a carbon material capable of being doped/dedoped with a lithium metal, a lithium alloy or an lithium ion.

For example, for constructing lithium secondary cells comprising the electrolytic solution, employable as the positive electrode active material is a lithium-free metal sulfide or oxide, such as $TiS_2$, $MOS_2$, $NbSe_2$, $V_2O_5$ or the like, or a lithium-containing lithium composite oxide.

Especially for constructing cells having high energy density, preferably used is a lithium composite oxide consisting essentially of $Li_xMO_2$ (where M is preferably at least one transition metal, and $0.05 \leq x \leq 1.10$). The lithium composite oxide includes, for example, $LiCoO_2$, $LiNiO_2$, $Li_xNi_yCo_{1-y}O_2$ (where x and y vary depending on the cell discharging condition, but in general, $0<x<1$, and $0.7< y \leq 1$), $LiMn_2O_4$, etc.

The lithium composite oxide of that type may be prepared by grinding and mixing a lithium carbonate, nitrate, oxide or hydroxide with a carbonate, nitrate, oxide or hydroxide of cobalt, manganese, nickel or the like in accordance with the desired composition of the product, followed by firing the resulting mixture in an oxygen atmosphere at a temperature falling between 600 and 1000° C.

As the negative electrode, employable is a carbon material or the like capable of being doped/dedoped with lithium, a lithium alloy such as an Li-Al alloy or the like, or a lithium ion. The carbon material may be prepared at a predetermined temperature in a predetermined atmosphere. To prepare it, for example, employable is any of pyrolyzed carbons, cokes (petroleum cokes, pitch cokes, etc.), artificial graphites, natural graphites, carbon blacks (acetylene black, etc.), vitreous carbons, fired organic polymer materials (those as prepared by firing organic polymer materials in an inert gas stream atmosphere or in vacuum at suitable temperatures not lower than 500° C.), carbon fibers, etc.

As the solvent for the non-aqueous electrolytic solution, any one of the siloxane derivatives mentioned above may be used singly, or, as the case may be, may be combined with any other conventional known solvent. The other solvent includes, for example, propylene carbonate, ethylene carbonate, diethyl carbonate, methylethyl carbonate, 1,2-dimethoxyethane, 1,2-diethoxyethane, γ-butyrolactone, tetrahydrofuran, 1,3-dioxolane, dipropyl carbonate, diethyl ether, sulfolane, methylsulfolane, acetonitrile, propylnitrile, anisole, acetates, propionates, 2-methyltetrahydrofuran, etc. Two or more of these solvents may be used in mixture.

As the separator for preventing the current short-circuit to be caused by direct contact between the positive electrode and the negative electrode noted above, employable is a material capable of surely preventing the direct contact of the two electrodes and capable of passing therethrough or keeping therein an electrolytic solution, for example, nonwoven fabric of a synthetic resin such as polytetrafluoroethylene, polypropylene, polyethylene or the like, or even a porous ceramic film, a porous thin film or the like.

In the non-aqueous electrolyte cell of the invention, in which the electrolytic solution comprises an inorganic polymer siloxane derivative which has high chemical stability and is hardly combustible or has a low vapor pressure, such as that mentioned hereinabove, the electrolytic solution is prevented from being vaporized and decomposed, thereby reducing the danger of cell ignition and inflammation, and the cell has excellent cell capabilities even at high voltage.

As the other members constituting the cell of the invention, any conventional ones may be employed with no problem. The shape of the cell is not specifically defined, including, for example, coin-type, button-type, paper-type, angular or spiral-structured cylindrical cells, etc.

The invention is described concretely with reference to the following Examples, which, however, are not intended to restrict the scope of the invention.

EXAMPLE 1

To any of siloxane derivatives (1) to (3) of the following chemical formulae 11 to 13, added was a lithium salt with its concentration being varied. Each of the resulting mixtures was sandwiched between a pair of stainless plates each having a thickness of 0.145 cm and an area of 0.7854 cm$^2$, and its electric conductivity was obtained through so-called Cole-Cole plotting for which the sinusoidal current voltage applied is expressed in a symbolic method (complex expression). The data obtained are shown in Table 1.

The coefficient of kinematic viscosity at 25° C. of the siloxane derivative (1) of formula 11 was 100 cSt; that of the siloxane derivative (2) of formula 12 was 1600 cSt; and that of the siloxane derivative (3) of formula 13 was 400 cSt.

TABLE 1

| Sample No. | Siloxane Derivative | Type of Li Salt | Weight Mol Concentration (m) | Electric Conductivity (25° C.) [mS · cm$^{-1}$] |
|---|---|---|---|---|
| Sample 1 | Siloxane Derivative (1) | $(CF_3SO_2)_2NLi$ | 0.5 | $2.20 \times 10^{-1}$ |
| Sample 2 | Siloxane Derivative (1) | $(CF_3SO_2)_2NLi$ | 1.0 | $2.25 \times 10^{-1}$ |
| Sample 3 | Siloxane Derivative (1) | $(CF_3SO_2)_3CLi$ | 0.5 | $1.20 \times 10^{-1}$ |
| Sample 4 | Siloxane Derivative (1) | $(CF_3SO_2)_3CLi$ | 1.0 | $1.26 \times 10^{-1}$ |
| Sample 5 | Siloxane Derivative (2) | $(CF_3SO_2)_2NLi$ | 0.5 | $2.09 \times 10^{-2}$ |
| Sample 6 | Siloxane Derivative (2) | $(CF_3SO_2)_2NLi$ | 1.0 | $4.05 \times 10^{-2}$ |
| Sample 7 | Siloxane Derivative (2) | $(CF_3SO_2)_3CLi$ | 0.5 | $3.64 \times 10^{-2}$ |
| Sample 8 | Siloxane Derivative (2) | $(CF_3SO_2)_3CLi$ | 1.0 | $3.80 \times 10^{-2}$ |
| Sample 9 | Siloxane Derivative (3) | $(CF_3SO_2)_2NLi$ | 0.5 | $4.62 \times 10^{-2}$ |
| Sample 10 | Siloxane Derivative (3) | $(CF_3SO_2)_2NLi$ | 1.0 | $4.80 \times 10^{-2}$ |
| Sample 11 | Siloxane Derivative (3) | $(CF_3SO_2)_3CLi$ | 0.5 | $2.75 \times 10^{-2}$ |
| Sample 12 | Siloxane Derivative (3) | $(CF_3SO_2)_3CLi$ | 1.0 | $2.88 \times 10^{-2}$ |

Siloxane derivative (1):

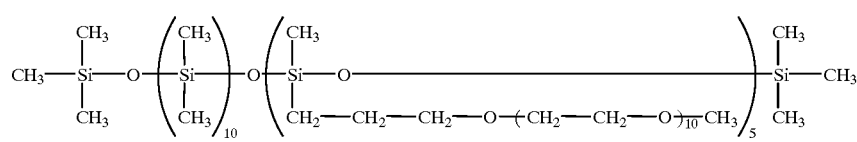

(11)

Siloxane Derivative (2):

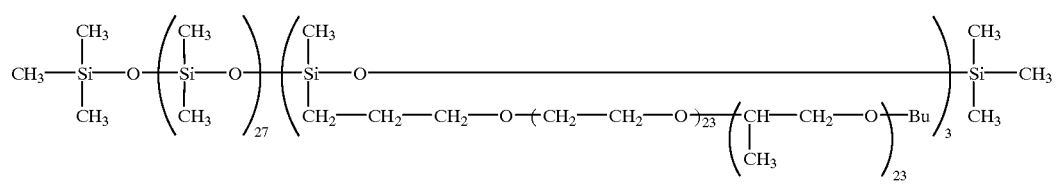

(12)

(Bu = —CH$_2$—CH$_2$—CH$_2$—CH$_3$)

Siloxane Derivative (3):

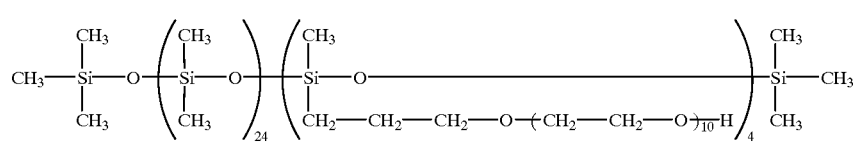

(13)

From the data in Table 1, it is known that the electric conductivity of the electrolytes comprising any of the siloxane derivatives of formulae 11 to 13 is satisfactory for use of the derivatives in cells. It is also known therefrom that, of the siloxane derivatives (1) to (3) each having a different coefficient of kinematic viscosity, the electrolyte comprising the derivative (1) having a lower coefficient of kinematic viscosity has a higher electric conductivity.

EXAMPLE 2

The cyclic voltamogram of each of the siloxane derivatives (1) and (2) of formulae 11 and 12 was measured to determine the oxidation stability of the derivatives. To measure this, used was a three-electrode electrochemical cell in which the working electrode was a nickel electrode (diameter: 0.5 mm) and the counter electrode and the reference electrode were of a lithium metal. In the cell, the potential before the generation of an oxidation current of 100 $\mu A \cdot cm^{-2}$ was measured to be a stable potential range. As a result, the oxidation stable potential of Sample 2 was 5.8 V; and that of Sample 6 was 6.0 V.

These data indicate that the siloxane derivatives exhibit excellent cell capabilities even at high voltage.

EXAMPLE 3

A coin cell was produced, comprising a positive electrode of $LiCoO_2$, a negative electrode of a carbon material and an electrolytic solution comprising the siloxane derivative (1) of formula 11, and subjected to a charge-discharge test. In the test, 20 charge-discharge cycles were repeated. For one cycle, the uppermost voltage was 4.2 V, the lowermost voltage was 3.0 V, and the discharge current was 100 $\mu$A. The charge-discharge test data are in FIG. 1.

From the data in FIG. 1, it is known that the cell capabilities of the cell comprising the siloxane derivative (1) are good.

In the following Examples, prepared were four types of a non-aqueous electrolytic solution comprising a siloxane derivative of the following chemical formula 14 and a lithium salt of $(CF_3SO_2)_2NLi$ added thereto. The amount of $(CF_3SO_2)_2NLi$ added was varied as in Table 2. Precisely, 0.5 mols, per gram of the siloxane derivative, of the salt was added in Example 4; 1.0 mol in Example 5; 1.5 mols in Example 6; and 3.0 mols in Example 7.

The non-aqueous electrolytic solutions of these Examples were subjected to an ion conductivity test. In the test, each solution was sandwiched between a pair of stainless plates each having a thickness of 0.145 cm and an area of 0.7854 $cm^2$, to which was applied a voltage, and its electric conductivity was obtained through so-called Cole-Cole plotting for which the sinusoidal current voltage applied is expressed in a symbolic method (complex expression). The data obtained are shown in Table 2. The coefficient of kinematic viscosity at 25° C. of the siloxane derivative of formula 14 used in these Examples was 20 cSt.

From the data obtained, it is known that the electric conductivity of the non-aqueous electrolytic solutions in these Examples is satisfactory for use of the solutions in cells.

The non-aqueous electrolytic solution of Example 5 was subjected to an oxidation stability test and a discharge characteristic test. In the oxidation stability test, the cyclic voltamogram of the solution was measured to determine the oxidation stability of the solution. To measure this, used was a three-electrode electrochemical cell, in which the working electrode was a nickel electrode having a diameter of 0.5 mm and the counter electrode and the reference electrode were of a lithium metal. In the cell, the potential before the generation of an oxidation current of 100 $\mu A/cm^2$ was measured to be a stable potential range. As a result, the oxidation stable potential of the solution tested was 4.8 V and was satisfactorily high. The test result indicates that the non-aqueous electrolytic solution exhibits excellent cell capabilities even at high voltage.

Figure 2:
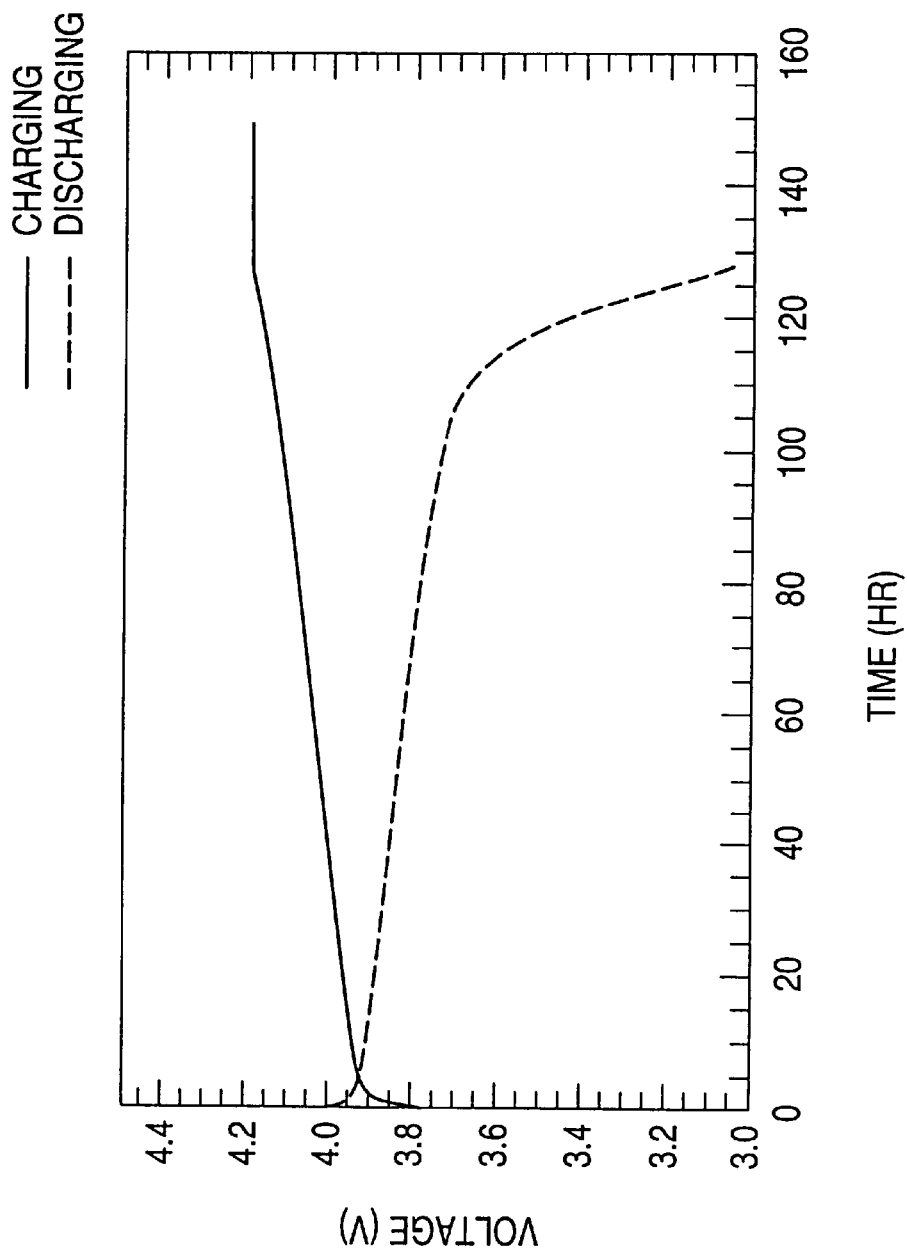
FIG. 2 is a characteristic graph showing the charge-discharge curves in the discharge characteristic test of the non-aqueous electrolyte cell of Example 5 of the invention.

In the discharge characteristic test, a coin-type test cell was produced and subjected to the test. The test cell comprised a positive electrode of $LiCoO_2$, and a negative electrode of a carbon material. In the test, 20 charge-discharge cycles were repeated. For one cycle, the uppermost voltage was 4.2 V, the lowermost voltage was 3.0 V, and the discharge current was 100 $\mu$A. The charge-discharge curves obtained in the test are in FIG. 2. From the data in FIG. 2, it is known that the charge-discharge characteristic of the cell comprising the non-aqueous electrolytic solution is good. The data indicate that cells comprising the non-aqueous electrolytic solution tested herein have good cell capabilities.

From the test results mentioned above, it is known that the electric conductivity and the charge-discharge characteristic

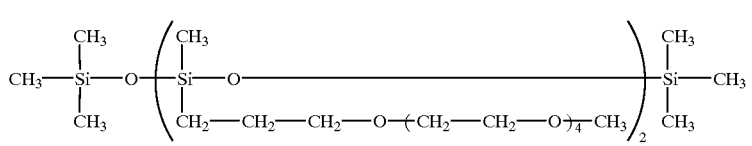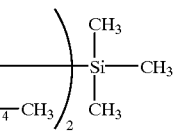

(14)

of the non-aqueous electrolytic solutions in these Examples are both satisfactory, and that the solutions are stable even at high voltage. Therefore, cells comprising any of those non-aqueous electrolytic solutions have good cell capabilities.

As is obvious from the description in the above, the non-aqueous electrolytic solution of the invention comprises a specific siloxane derivative and has good chemical and thermochemical stability. The non-aqueous electrolyte cell comprising the electrolytic solution of the invention has high safety, and has good cell capabilities even at high voltage.

TABLE 2

| | Amount of $(CF_3SO_2)_2NLi$ (mol) added to 1 g of siloxane derivative | Electric Conductivity (25° C.) (mS/cm) |
|---|---|---|
| Example 4 | 0.5 | $2.93 \times 10^{-1}$ |
| Example 5 | 1.0 | $4.04 \times 10^{-1}$ |
| Example 6 | 1.5 | $3.39 \times 10^{-1}$ |
| Example 7 | 3.0 | $1.03 \times 10^{-1}$ |

While the invention has been described in detail and with reference to specific embodiments thereof, it will be apparent to one skilled in the art that various changes and modifications can be made therein without departing from the spirit and scope thereof.

What is claimed is:

1. A non-aqueous electrolytic solution comprising a siloxane derivative of the following chemical formula 1, and at least one alkali metal salt:

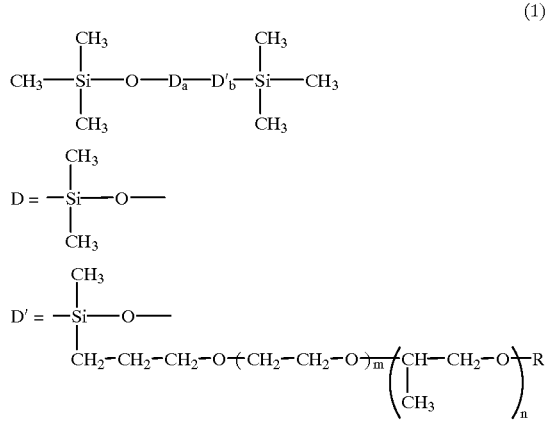

(1)

wherein a represents an integer of from 1 to 50; b represents an integer of from 1 to 20; m represents an integer of from 0 to 40; n represents an integer of from 0 to 40; R represents a hydrogen atom, or an optionally-substituted alkyl group; provided that when b>1, a plural number b of D's may be the same or different ones.

2. The non-aqueous electrolytic solution as claimed in claim 1, wherein said siloxane derivative has a coefficient of kinematic viscosity at 25° C. of not larger than 5000 cSt.

3. The non-aqueous electrolytic solution as claimed in claim 1, wherein said siloxane derivative has a mean molecular weight of not larger than 10000.

4. The non-aqueous electrolytic solution as claimed in claim 1, wherein said alkali metal salt is a lithium metal salt.

5. The non-aqueous electrolytic solution as claimed in claim 1, which has an electric conductivity at 25° C. of not smaller than 0.1 mS·cm$^{-1}$.

6. A non-aqueous electrolyte cell comprising a positive electrode of an oxide or a sulfide capable of being doped/dedoped with a lithium ion, a negative electrode of a carbon material capable of being doped/dedoped with a lithium metal, a lithium alloy or an lithium ion, and a non-aqueous electrolytic solution, wherein;

said non-aqueous electrolytic solution comprises a siloxane derivative of the following chemical formula 2, and at least one lithium metal salt:

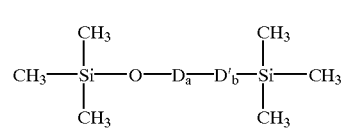

(2)

-continued

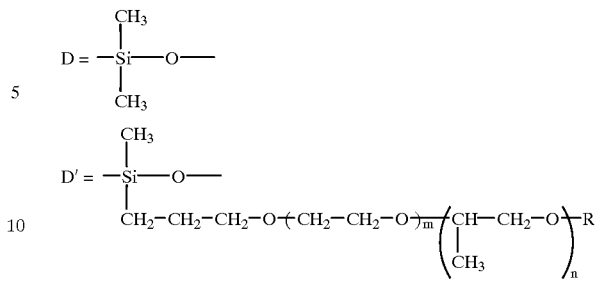

wherein a represents an integer of from 1 to 50; b represents an integer of from 1 to 20; m represents an integer of from 0 to 40; n represents an integer of from 0 to 40; R represents a hydrogen atom, or an optionally-substituted alkyl group; provided that when b>1, a plural number b of D's may be the same or different ones.

7. The non-aqueous electrolyte cell as claimed in claim 6, wherein said siloxane derivative has a coefficient of kinematic viscosity at 25° C. of not larger than 5000 cSt.

8. The non-aqueous electrolyte cell as claimed in claim 6, wherein said siloxane derivative has a mean molecular weight of not larger than 10000.

9. The non-aqueous electrolyte cell as claimed in claim 6, wherein said non-aqueous electrolytic solution has an electric conductivity at 25° C. of not smaller than 0.1 mS·cm$^{-1}$.

10. A non-aqueous electrolytic solution comprising a siloxane derivative of the following chemical formula 3, and at least one light metal salt:

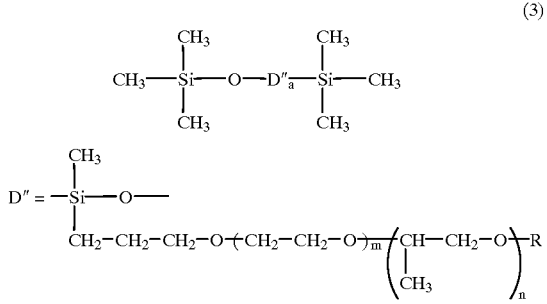

(3)

wherein a represents an integer of from 1 to 50; m represents an integer of from 0 to 40; n represents an integer of from 0 to 40; R represents a hydrogen atom or an alkyl group; provided that when a>1, a plural number a of D"s may be the same or different ones; and hydrogens in D" and R may be optionally substituted with halogen atoms.

11. The non-aqueous electrolytic solution as claimed in claim 10, wherein said siloxane derivative has a coefficient of kinematic viscosity at 25° C. of not larger than 5000 cSt.

12. The non-aqueous electrolytic solution as claimed in claim 10, wherein said siloxane derivative has a mean molecular weight of not larger than 10000.

13. The non-aqueous electrolytic solution as claimed in claim 10, wherein said light metal salt is a lithium metal salt.

14. The non-aqueous electrolytic solution as claimed in claim 10, which has an electric conductivity at 25° C. of not smaller than 0.1 mS/cm.

15. A cell comprising;
a positive electrode,
a negative electrode, a separator disposed between said positive electrode and negative electrode, and a non-aqueous electrolytic solution comprising a siloxane derivative of the following chemical formula 4, and at least one light metal salt:

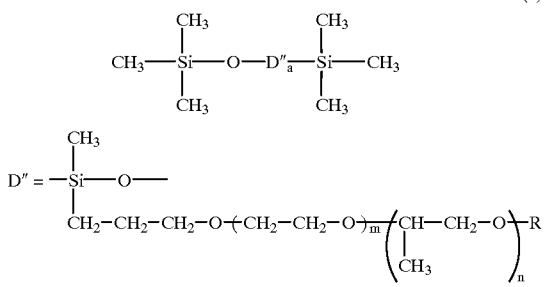

(4)

wherein a represents an integer of from 1 to 50; m represents an integer of from 0 to 40; n represents an integer of from 0 to 40; R represents a hydrogen atom or an alkyl group; provided that when a>1, a plural number a of D"s may be the same or different ones; and hydrogens in D" and R may be optionally substituted with halogen atoms.

16. The cell as claimed in claim 15, wherein the siloxane derivative in said non-aqueous electrolytic solution has a coefficient of kinematic viscosity at 25° C. of not larger than 5000 cSt.

17. The cell as claimed in claim 15, wherein the siloxane derivative in said non-aqueous electrolytic solution has a mean molecular weight of not larger than 10000.

18. The cell as claimed in claim 15, wherein said non-aqueous electrolytic has an electric conductivity at 25° C. of not smaller than 0.1 mS/cm.

19. The cell as claimed in claim 15, wherein said positive electrode comprises an oxide or a sulfide capable of absorbing and desorbing a lithium ion, and said negative electrode comprises a carbon material capable of absorbing and desorbing lithium, a lithium alloy or a lithium ion.

* * * * *